(12) United States Patent
Steadman Booker et al.

(10) Patent No.: US 10,267,928 B2
(45) Date of Patent: Apr. 23, 2019

(54) DARK CURRENT COMPENSATION

(71) Applicant: KONINKLIJKE PHILIPS N.V., Eindhoven (NL)

(72) Inventors: Roger Steadman Booker, Aachen (DE); Ewald Roessl, Ellerau (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/776,096

(22) PCT Filed: Nov. 23, 2016

(86) PCT No.: PCT/EP2016/078481
§ 371 (c)(1),
(2) Date: May 15, 2018

(87) PCT Pub. No.: WO2017/089363
PCT Pub. Date: Jun. 1, 2017

(65) Prior Publication Data
US 2018/0321395 A1    Nov. 8, 2018

(30) Foreign Application Priority Data

Nov. 26, 2015 (EP) ...................................... 15196524

(51) Int. Cl.
*G01T 1/24* (2006.01)

(52) U.S. Cl.
CPC ................ *G01T 1/244* (2013.01); *G01T 1/24* (2013.01)

(58) Field of Classification Search
CPC ............ G01T 1/24; G01T 1/247; G01T 1/244
See application file for complete search history.

(56) References Cited

U.S. PATENT DOCUMENTS

| 6,034,406 | A | 3/2000 | Kobayashi |
|---|---|---|---|
| 2003/0132391 | A1 | 7/2003 | Agano |
| 2008/0099689 | A1 | 5/2008 | Nygard |
| 2009/0046180 | A1 | 2/2009 | Shibano |
| 2009/0290049 | A1 | 11/2009 | Ukita |
| 2009/0290050 | A1 | 11/2009 | Herrmann |
| 2011/0168892 | A1 | 7/2011 | Steadman |
| 2011/0248175 | A1 | 10/2011 | Frach |
| 2011/0291017 | A1 | 12/2011 | Frach |
| 2013/0284940 | A1 | 10/2013 | Herrmann |
| 2014/0014818 | A1 | 1/2014 | Cho |

FOREIGN PATENT DOCUMENTS

GB    2370960    7/2002

OTHER PUBLICATIONS

Steadman et al, "A CMOS Photodiode Array with In-Pixel Data Acquisition System for Computed tomography", IEEE JSSC 2004, vol. 39.

*Primary Examiner* — David P Porta
*Assistant Examiner* — Fani Boosalis

(57) ABSTRACT

The present invention is directed towards a photon counting radiation detector (10) comprising an array of pixels (13) comprising a plurality of detection pixels (131) for detecting imaging information. At least one pixel of the array of pixels (132) is shielded from receiving radiation. A dark current is determined from the shielded pixel (132) and is used to compensate for dark current in the other, non-shielded pixels (131). Embodiments are directed to integrating pixel shielding within an Anti Scatter Grid or in a mask.

9 Claims, 6 Drawing Sheets

DARK CURRENT COMPENSATION

CROSS REFERENCE TO RELATED APPLICATIONS

This application is the U.S. National Phase application under 35 U.S.C. § 371 of International Application No. PCT/EP2016/078481, filed Nov. 23, 2016, published as WO 2017/089363 on Jun. 1, 2017, which claims the benefit of European Patent Application Number 15196524.1 filed Nov. 26, 2015. These applications are hereby incorporated by reference herein.

FIELD OF THE INVENTION

The present invention generally relates to a radiation detector comprising an array of pixels comprising a plurality of detection pixels for detecting imaging information. The present invention further relates to a spectral radiation method and an imaging system.

BACKGROUND OF THE INVENTION

Energy-resolving photon counting detectors are based on direct conversion materials, such as Cadmium Zinc Telluride (CdZnTe, also known as CZT) or Cadmium Telluride (CdTe). Direct conversion materials are compound semiconductors that often exhibit non-negligible unwanted which cause false information and/or increased noise or loss of resolution. For instance, a detector pixel may receive some charge intended for a neighboring pixel (charge sharing) or it may exhibit current running through the semiconductor material even when no radiation is emitted towards the semiconductor (dark current). The dark current ranges from a few nA per pixel to several tens of nA per pixel depending on the type of electrodes (e.g. blocking or Ohmic electrodes) and sensor resistivity. Said dark current is highly dependent on temperature, typically in an exponential function, mainly caused by increased thermal equilibrium densities of conduction band electrons and valence band holes with increasing temperature.

Particularly CZT exhibits a number of undesirable artefacts with various causes which have been continuously improved upon in recent years. To address some of these artefacts (e.g. photoconductive gain) Baseline Restoration (BLR) circuits for example are required. Such circuits also compensate for the dark current and slow fluctuations caused by temperature changes. BLR circuits however also cause a number of artefacts themselves in the context of high rate applications. As soon as CZT does not exhibit any flux dependent excess current (other than photo-current) the use of a BLR is not any longer justifiable given the additional artifacts that it causes and particularly considering that dealing with such circuit imperfections (sensitivity to induction, pile-up, etc.) requires development of significantly more complex circuits.

An acceptable solution for the aforementioned dark-current dependency on temperature would be highly desirable. A change in dark current causes a baseline shift which will in turn cause an error in energy estimation. Although the detector temperature is generally regulated, a temperature margin below +/−1° C. may not be ensured. This may cause energy drifts exceeding 2 keV depending on implementation.

Current solutions include for instance grid-switch sampling: synchronizing the sampling of the baseline shift to a short period where the x-rays are off, distributed throughout a complete scan, as is for instance known from US 2013/0284940 A1. This solution requires special, advanced X-ray tube and generator functionality.

Another solution may be pre-scan sampling: before starting a scan, the baseline is sampled and the dark-current is compensated for. For long scans however the temperature may deviate, which causes an energy estimation error.

A third potential solution is AC coupling: this completely eliminates sufficiently low frequency changes. It however requires a large decoupling capacitor and input biasing resistor, not compatible with the high level of monolithic integration needed. It also requires a BLR or a baseline holder (BLH) to re-establish a reference.

US2011/0248175A1 discloses a temperature compensation circuit for nuclear detectors that include reference APDs placed on the detector surface together with sensor pixels.

SUMMARY OF THE INVENTION

It is an objective of the present invention to compensate for undesired currents in detector pixels.

Embodiments according to the present invention are directed to a photon counting radiation detector comprising an array of pixels comprising a plurality of detection pixels for detecting imaging information. At least one pixel of the array of pixels is shielded from receiving radiation. This allows the shielded pixel to be used as a reference pixel from which various properties may be simultaneously determined with pixels that are receiving radiation, but without the effect of the radiation. This may then for instance be used to set a baseline or correct properties of the irradiated pixels.

In a preferred embodiment the detection pixels are direct conversion detection pixels, preferably detection pixels based on Cadmium Zinc Telluride.

In a further preferred embodiment the at least one shielded pixel is shielded from incoming radiation by a radiation absorbing covering, preferably a radiation absorbing coating or a radiation absorbing structure.

In a further preferred embodiment the photon counting radiation detector further comprises at least one compensation area that comprises the at least one shielded pixel; a dark current determiner that is connected to the compensation area and that is configured to measure current from the compensation area and to determine a dark current value from current measured from the at least one compensation area; and a dark current compensator that is configured to apply a dark current compensation to detected imaging information based on the determined dark current value. As such, a current is measured from the compensation area, which is made up from one or more shielded pixels, and therefore any current generated therein cannot result from impinging radiation. Therefore a dark current value may be determined from the measured current and used to compensate for dark current in the other, irradiated pixels.

In a further preferred embodiment an anti-scatter grid is mounted above the array of pixels, wherein the each of the at least one compensation area is surrounded by walls of the anti-scatter grid. The ASG grid is particularly suitable to subdivide the detector anode surface into sections containing one or more pixels, which then can be efficiently shielded. Construction of the shielded areas is particularly convenient when using ASG sections. Preferably the compensation area covers one or four detection pixels, these are small section. A single pixel may provide a good indication of a dark current per pixel, but neighboring pixels may influence the shielded pixel anyway and construction of the ASG becomes more complex at smaller dimensions. Using more pixels overcomes this at least partly, but at the cost of increased complexity of read-out and compensation electronics. Four pixels provides a particularly good compromise between ASG construction and electronics complexity.

In a further preferred embodiment the dark current compensator is configured to apply a dark current compensation by delivering a compensation current, preferably at a compensation current value that is the inverted value of the determined dark current value, to the detection pixels, preferably to all detection pixels. This allows for direct compensation during a scan.

In an alternative further preferred embodiment the dark current compensator is configured to provide a dark current compensation value that is used to compensate the detected imaging information during image reconstruction. This allows for a reduced amount of electronics, since all compensation is performed digitally and only the dark current determiner needs to be physically present. The determined dark current value is then used as an additional input for image data processing, such as image reconstruction algorithms.

In a further preferred embodiment the dark current determiner is configured to determine the dark current value at a lower sampling rate than that of imaging information. This reduces the amount of processing without significantly compromising the quality.

In a further preferred embodiment the compensation area is surrounded by charge sharing prevention means, preferably a guard ring. This reduces influences on the compensation area by surrounding pixels.

In a further preferred embodiment a radiation mask shields a plurality of pixels of the array of pixels. A mask is a convenient way of shielding one or more pixels, forming one or more compensation areas. It also allows a further embodiment wherein the radiation mask shields the plurality of pixels in a regular pattern, preferably a checkboard pattern, more preferably covering every other pixel of the array of pixels. This allows, amongst others, for constructing an Ultra high Energy Resolution (UHER) detector.

Another embodiment of the present invention is directed towards a corresponding spectral radiation detection method, comprising the steps of irradiating a Photon counting radiation detector comprising an array of pixels comprising a plurality of detection pixels for detecting imaging information and at least one pixel that is shielded from incoming radiation and that is configured to determine a dark current value; and applying a dark current compensation to the detected imaging information based on the determined dark current value.

A further embodiment of the present invention is directed towards a corresponding spectral radiation detection method, comprising irradiating a photon counting radiation detector comprising an array of pixels comprising a plurality of detection pixels for detecting imaging information and at least one pixel that is shielded from incoming radiation, wherein a plurality of shielded pixels is shielded from radiation by a radiation mask, preferably in a regular pattern, more preferably a checkboard pattern.

A further embodiment of the present invention is directed towards an imaging system comprising a photon counting radiation detector according to the present invention. In a preferred embodiment the radiation detector is an x-ray radiation detector, preferably a computed tomography x-ray detector.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

BRIEF DESCRIPTION OF THE DRAWINGS

The present invention is illustrated by drawings of which
FIG. 4 shows an electrical implementation of measuring a dark current and providing a compensation current according to the present invention, in which

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not be according to scale.

DETAILED DESCRIPTION OF EMBODIMENTS

Radiation detectors are used to obtain imaging information of an object (such as a human being) that is irradiated by a radiation source. All non-attenuated radiation passes the object to enter the radiation detector wherein the radiation is converted into imaging information. Alternative radiation detectors may be used in for instance astronomy or photography, wherein incoming radiation is detected to provide information or an image of an object.

Figure 1:
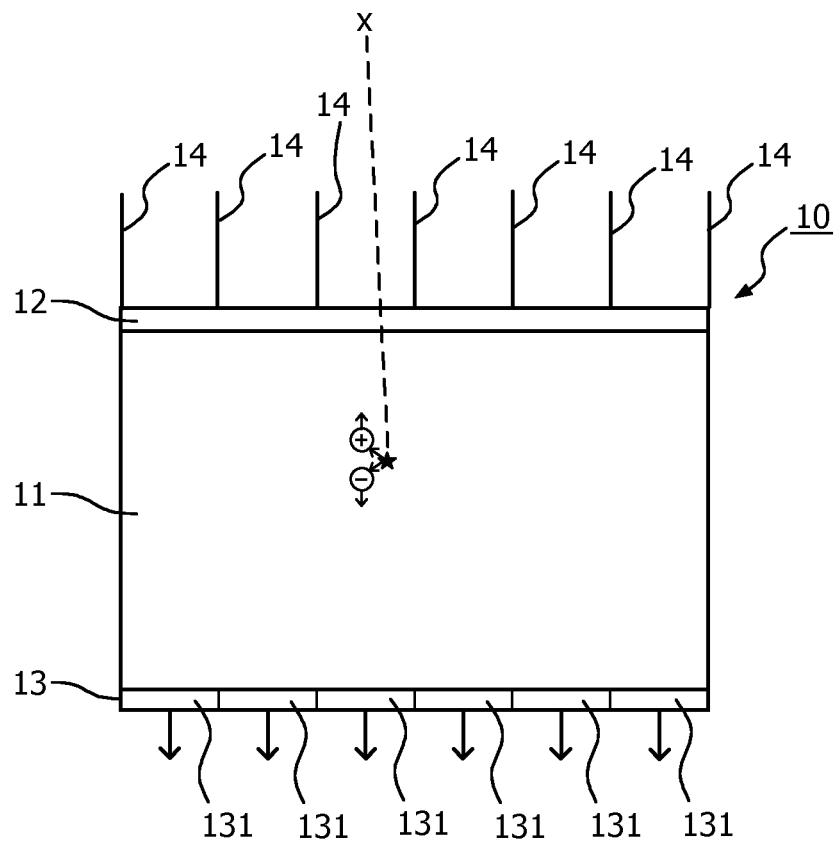
FIG. 1 shows a schematic depiction of a cross-section of a photon counting radiation detector.

The present invention relates to compensation for dark current drift in photon counting detectors, such as for instance used in spectral radiation imaging. Often these detectors are based on a direct conversion radiation principle. FIG. 1 shows a highly schematic depiction of a direct conversion photon counting detector 10 in cross section.

A bulk of the direct photon conversion photon counting detector 1 is formed by direct conversion material layer 11. The direct conversion material layer 11 may be composed of a single-crystal semiconductor material, which is an intrinsic material or has a fully depleted p-i-n structure. CZT is a suitable semiconductor material in light of embodiments of the present invention, but other direct conversion materials known to the skilled person would also benefit from the advantages of the present invention (e.g. CdTe, Si, GaAs, etc.). The direct conversion layer 11 is placed between detector cathode 12 and detector anode 13. The detector cathode is held at a negative bias potential, while the detector anode is held at a less repelling (usually an attracting positive) potential. The detector cathode 12 forms a continuous layer on the direct conversion material layer 11 and is generally transparent (or has negligible absorption) to photons with an energy level that are to be detected by the direct conversion photon counting detector. The detector anode 13 is on the opposite side of the direct conversion layer 11 and is made up from an array 13 of detector pixels 131.

When a photon x passes the detector cathode 12 and penetrates into the direct conversion material layer 11, the photon interacts with direct conversion material to generate numerous electron-hole pairs. The positively charged holes drift towards the strongly negatively charged detector cathode 12, while the negatively charged electrons drift towards the more positively charged detector anode 13. When the electrons approach detector anode 13, a signal is induced (typically a current) from each detector pixel 131, which, after collection, is indicative of the charge of the electron cloud that approached that particular electrode pixel 131. The generated signal is then further processed by processing units (not shown) generating an estimate of the energy of the impinging photon(s) within a plurality of so-called energy bins are counted. The information is eventually displayed on a display unit (not shown) to a user as written information or as a reconstructed image of (part of) an examined object.

Figure 2:
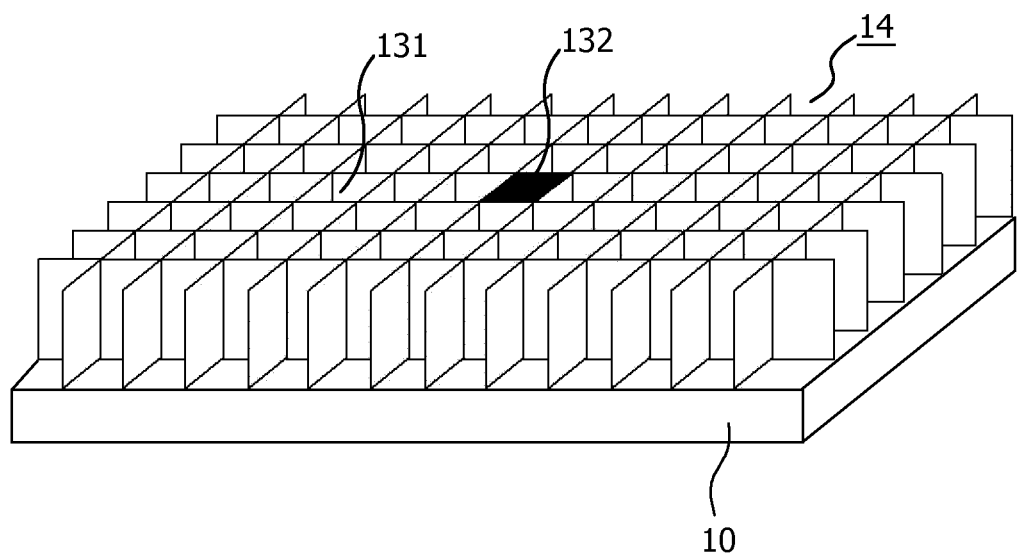
FIG. 2 shows a schematic depiction of an anti-scatter grid on top of a radiation detector with one area blocked form radiation.

In some cases photons may not be counted by the correct pixel, e.g. through crosstalk or photons impinging in the volume above the gap of two adjacent anodes or at angles strongly deviating from the normal. There are various ways to address this. One particularly often used solution is the use of an anti-scatter grid (ASG) 14, which is a structure placed on the detector 10 with walls made from a radiation absorbing material, such as Tungsten, protruding substantially perpendicular from the detector surface towards a radiation source. Photons entering at a too large angle deviating from the normal are absorbed or diverted by the walls 14. FIG. 2 shows a three dimensional depiction of an ASG 14 placed on a detector 10. The ASG walls 14 divide the top surface into discrete sections, usually covering one pixel 131 or groups of pixels 131 (e.g. 2 by 2 pixels).

As was previously addressed, even when direct conversion pixels 131 are not irradiated, they still generate a small current, the so-called dark current, which is usually caused or influenced by temperature changes. The resulting baseline shift needs to be corrected. The present invention is based on the insight that a pixel 132 not irradiated during a radiation detection procedure only generates a dark current signal under the exact same conditions as the other, irradiated, pixels 131 (the 'detector pixels') in the array of anode pixels 13. This may be achieved by creating a compensation area 132 composed of one or more pixels that are shielded from radiation. When a current is measured from the compensation area 132, this will result in a representative dark current value. This dark current value may then be used to compensate a measured current value of the detection pixels 131, for instance by simply subtracting the current value measured from the compensation area 132 (corrected for the amount of pixels in the compensation area 132) from the measured current value of each of the detection pixels 131.

A pixel may be shielded from radiation by using a radiation absorbing that blocks radiation from reaching the underlying pixel. This may be realized by using a fully absorbing material in the form of, for instance, an absorbing coating or an absorbing structure, such as a block or plate that is applied or placed on or above the pixel to be shielded. Shielding may also be realized by using a combination of a coating and a structure. An advantage of using a coating is that it is relatively easy to apply to a pixel during manufacturing, e.g. by printing. However, fully absorbing coatings might be difficult to obtain, especially for thin coatings and/or high energy radiation. Structures may be incorporated in the manufacturing stage in various ways, e.g. combine them with an ASG or place, cast or print these on or above a pixel. Thicker structures are more efficient in blocking radiation, but precise placement is crucial. Shielding may also be done outside the radiation detector 10, e.g. by a filter placed between the detector cathode 12 and the ASG 14, or, alternatively, between the radiation source and the radiation detector 10, although exact alignment may be quite difficult in this situation.

Alternatively, for laser sintered type of ASG structures, the blocking element may be formed at the same process step as the ASG themselves, eliminating any misalignment or mechanical handling thereafter. This may however result in an increased cost due to manufacturing times and material.

The exemplary embodiment shown in FIG. 2 has an ASG array 13 with a center area forming the compensation area 132 in which the impinging X-rays are completely blocked. The compensation area 132 is achieved by adding a highly absorbing material and covers all detector pixels underneath. Typically one or four pixels depending on detector sub-pixilation. In the figure the center area is shielded. The position of the shielded area may be on any other place in the array, but preferably not at the edge of the array, as dark-current changes might not be indicative of the changes in current in the bulk of the CZT. Furthermore, an array 13 and ASG 14 may be equipped with 1 or more of said compensation areas 132.

Figure 3A:
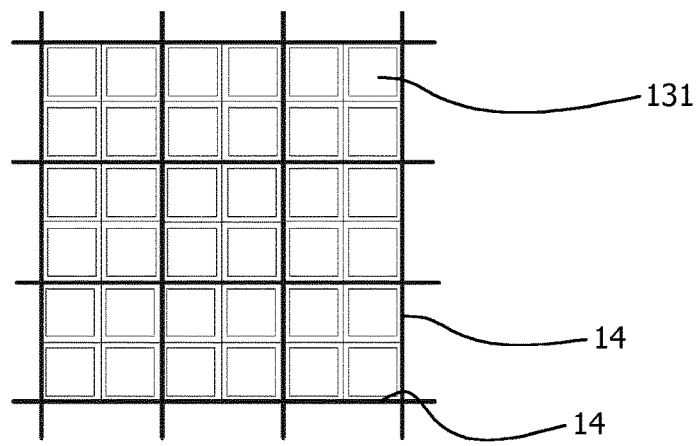
FIG. 3 shows schematic depictions of a top view of an array of detector pixels in which no pixels are blocked from radiation (FIG. 3A, 3B), an array of detector pixels with blocked pixels forming a compensation area according to the present invention (FIG. 3C).
Figure 3B:
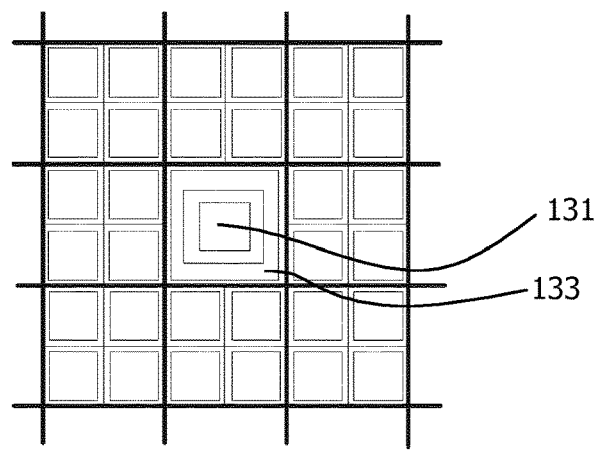

FIG. 3A shows a conceptual view of known CZT anodes aligned to an ASG 14. In this example each ASG section confines 2×2 detector pixels. The pixels in the center ASG section are fully absorbing X-rays. FIG. 3B shows an alternate embodiment with a different anode geometry with a single pixel 131 in one ASG section surrounded by a guard ring 133 to ensure a proper electric field distribution. The benefit of the structure shown in FIG. 3B is that the anode is kept purposely far away from all neighbors, therefore completely eliminating spurious events cause by charge sharing and/or k-escape.

Figure 3C:
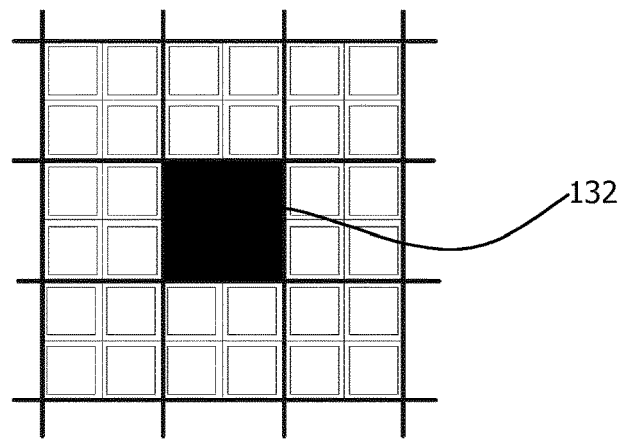

In FIG. 3C a compensation area 132 is formed by shielding the 2×2 pixels 131 in the central ASG section of FIG. 3A or the single pixel 131 with guard ring 133 of FIG. 3B with a radiation shielding material. The pixel(s) underneath receive no impinging photons and the only signal present at the respective anodes is their dark current. Said dark-current is measured and used to provide a compensation current to all other pixels 131 within the array 13. This may be done under the assumption that the dark current measured at the blocked ASG section is indicative for the dark-current at different bulk locations. The degree by which this assumption will be satisfied increases with sensor homogeneity and is justified by the fact that temperature drifts will likely appear homogenously on one CZT crystal forming on detector tile, connected to one ASIC. An advantage of using 2×2 shielded pixels 131 (as in FIG. 3A) is that four different dark measurements are obtained which may be averaged or outliers might be disregarded to be less dependent on a single pixel quality or (slight) size differences between pixels. An advantage of using a single pixel 131 with a guard ring 134 (as in FIG. 3B) is that a central measurement within the ASG section is obtained and spill-over effects, such as charge sharing, from surrounding pixels is minimized.

Figures 4A, 4B:
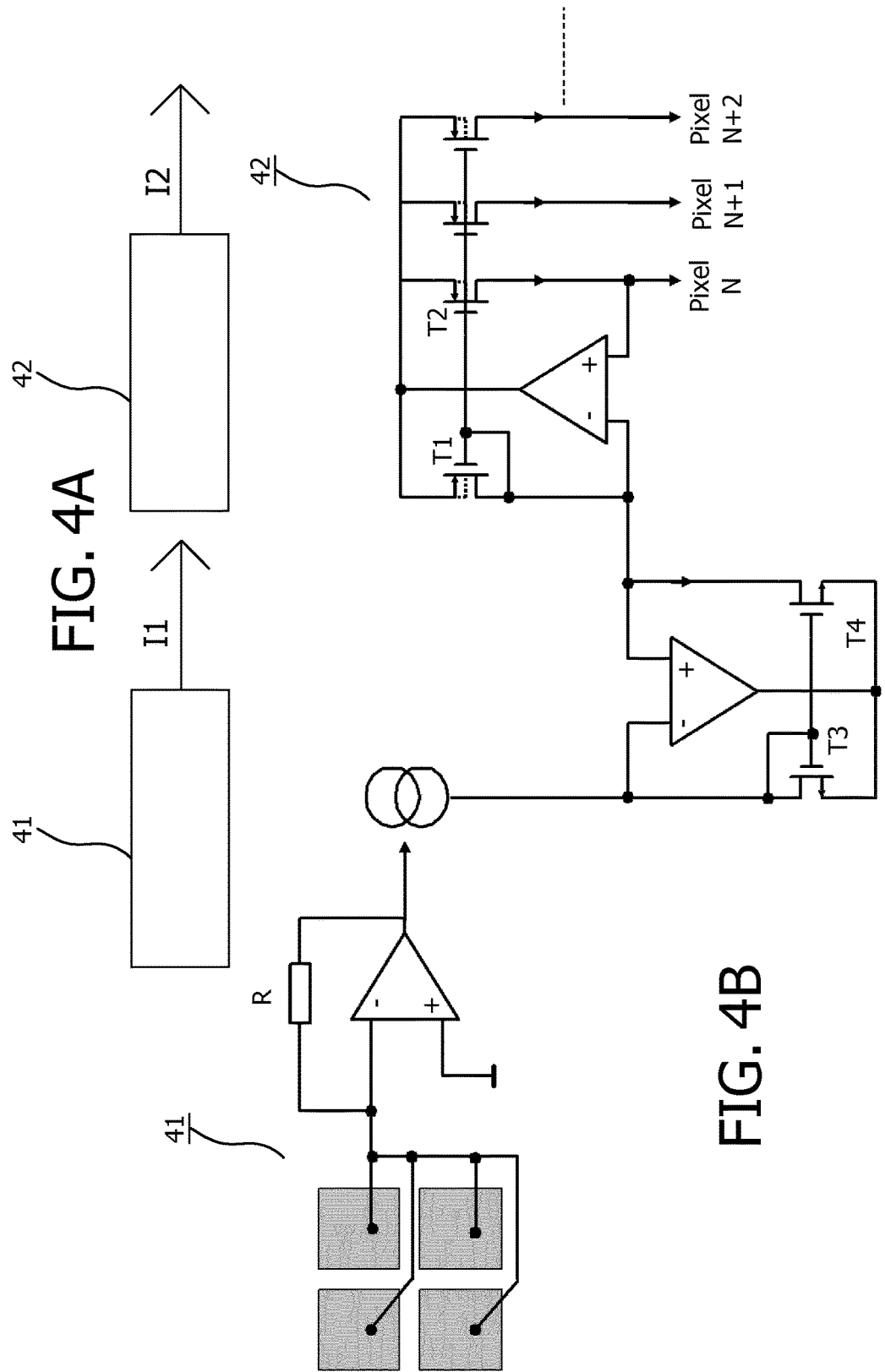
FIG. 4A is a highly schematic representation of the basic components and FIGS. 4B, 4C and 4D show examples of how this may be implemented in electrical circuitry.

The highly schematic representation of FIG. 4A shows a dark current determiner 41 that determines a dark current value I1 from the shielded pixel(s) of a compensation area

132. This dark current value I1 is then used as input for a dark current compensator 42 that provides a dark current compensation I2, which is used to correct the measured current value of the detection pixels 131. The most straightforward manner is to define the dark current compensation I2 as the reverse of the determined dark current value I1 (I2=−I1). Other compensation manners in which more or less current is used for compensation are contemplated as well within the present invention.

Determining the dark current from the compensation area 132 and compensating for the dark current in the detection pixels 131 may be realized in various manners. One exemplary implementation of an electrical circuit underneath a compensation area 132 comprising four shielded pixels is shown in FIG. 4B. The dark current determiner 41 comprises a simple transimpedance amplifier that is used to for instance generate a voltage proportional to the dark current present on the four single pixels. A current is then generated corresponding to the very same dark current (or any magnitude representative of the dark current). In the dark current compensator 42 this current is inverted in sign (positive to negative or vice versa) by using two regulated current mirrors. One output compensation current per pixel is then distributed to the full array. The current mirrors shown in FIG. 4B are known from US 20110168892 A1, but other known mirror topologies are also possible and considered. The output current of this circuit is equal to the dark current and has the right sign to be injected to all detection pixels 131 (Pixel N, Pixel N+1, Pixel N+2, etc.) exposed to radiation in the array. Effectively, all detection pixels 131 in the array are compensated. The current signs and the necessity of one or two current mirrors will depend on the implementation of the transimpedance amplifier and the voltage controlled source. In the example of FIG. 4B, where four pixels are used to determine a dark-current, the output current per pixel preferably is made to represent one quarter of the acquired dark current. This gain factor may be implemented at the voltage controlled current or by simple dimensioning of the transistors forming the current mirrors.

Compensation is perfect for the case that the complete array 13 is at a same temperature. Even if the exact dark current may differ across the array 13, the compensation will ensure that the drift caused by temperature will not affect the energy estimation, i.e. a certain amount of dark current may still be present but will not fluctuate over time. Only when the temperature in the array 13 has a significant gradient across the array (e.g. >>2 degrees Celsius), the amount of compensation may not suffice but it will still however minimize baseline drifts.

As an extension of the embodiment shown in FIG. 4B, multiple compensation areas 132 covers, for instance, four individual shielded pixels or four groups of 2×2 shielded pixels, each close to, but not at, the four corners of the CZT crystal. In this way a better sampling of the dark current as well as gradients of the dark current on the sensor in both directions can be achieved. However, more complex electronics are needed to implement interpolation (or extrapolation towards the peripheral areas of the sensor) of the dark-current figures to be subtracted.

Figure 4C:
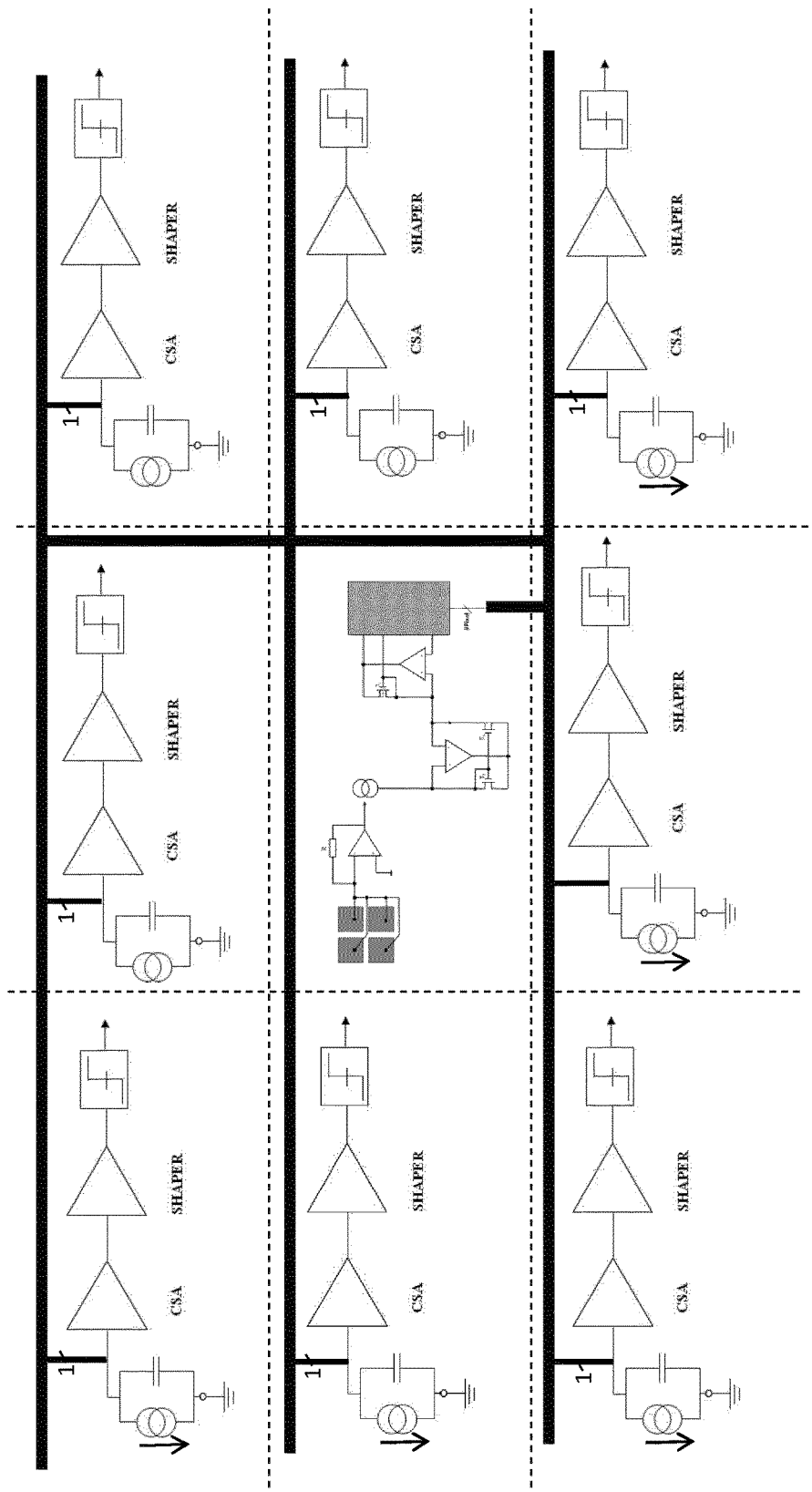

FIG. 4C conceptually shows an embodiment that allows the compensation current to be distributed across pixels. This particular embodiment requires routing as many signals as pixels 131 that are present in the array 13. A more practical implementation is to move the output branch of the current mirror to each pixel. In this way only the gate voltage, which is common to all pixels 131, needs to be distributed, i.e. the compensation area 132 (the center section of the depicted circuit) only has a single output, which is then routed to the detection pixels 131. In yet another alternative, the current mirror may remain within the center pixel but is only distributed to a single pixel. A current regeneration circuit may then be used on each pixel to redistribute to a neighbor and so on and so forth. Such a regeneration circuit is for instance known from US 20110168892 A1.

Figure 4D:
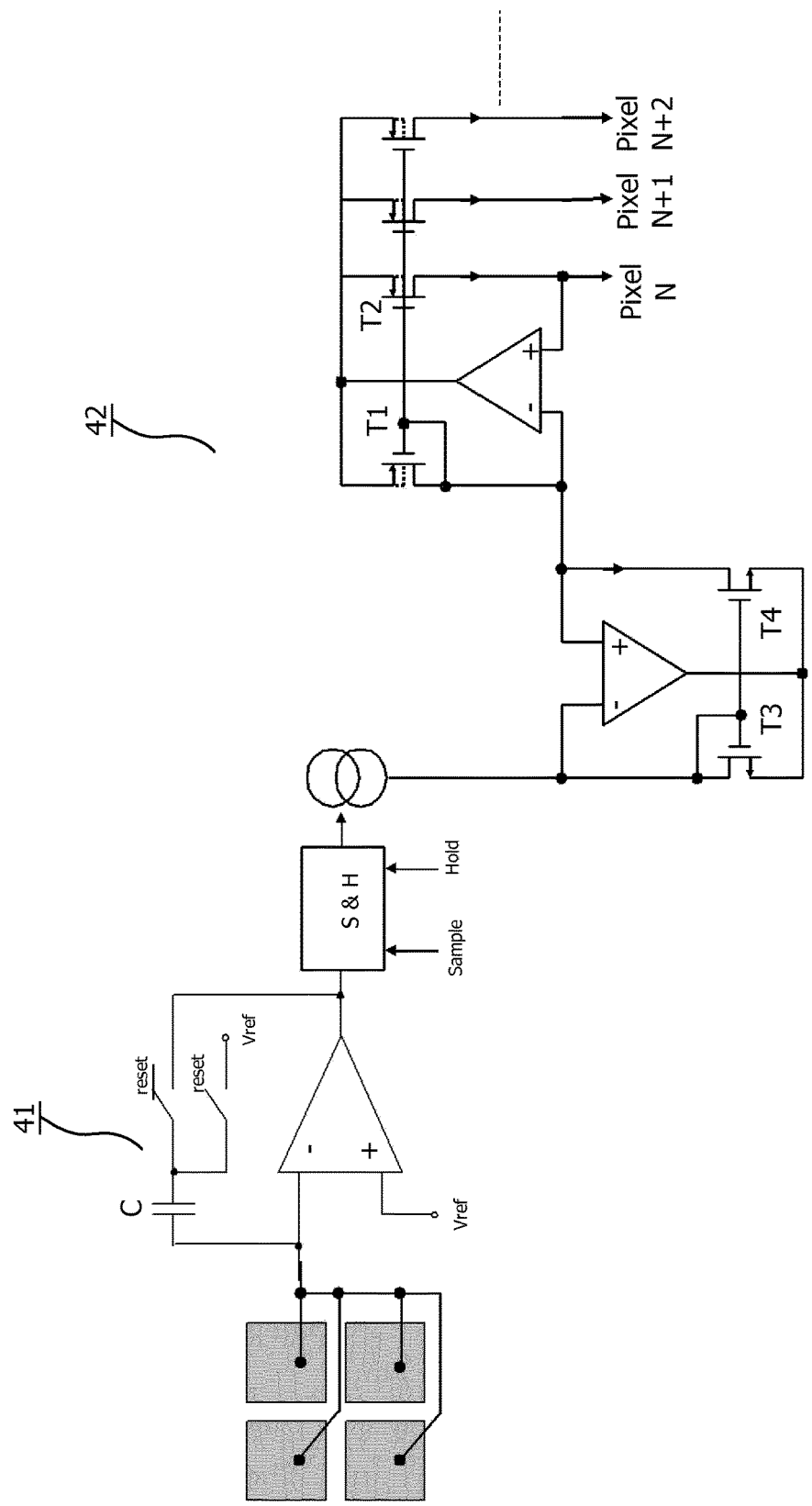

The circuit shown in FIG. 4B operates continuously. The transimpedance amplifier design is therefore critical in terms of noise and the correction will strongly depend on the amplifier having a very small input referred offset. A more adequate implementation may therefore consist of an integrator stage followed by a sample-and-hold stage. The compensation can therefore be updated at given time intervals (e.g. one per frame). Since dark current changes mainly manifest as low frequency components, updating at time intervals of once per one or more frames may suffice. An exemplary embodiment to implement this is shown in FIG. 4D. The integrator significantly improves the noise characteristics and allows implementing a Correlated Double Sampling (CDS) technique to remove the influence of a finite input offset and 1/f noise, for instance as known from R. Steadman et al, "A CMOS Photodiode Array with In-Pixel Data Acquisition System for Computed tomography", IEEE JSSC 2004, Vol. 39).

In yet another embodiment of the present invention, it is suggested to refrain from the compensation of the dark-current by means of hardware. As an alternative, the dark current readings are periodically sampled during the detector operation but with sampling rates typically much below the sampling rate of the detector itself in view of the very slow changes in temperature expected during a scan. The sampled values are digitized and sent out together with imaging data for reconstruction. During image reconstruction changes in the dark current with time are translated to changes in shifts of energy thresholds based on gain of the charge-sensitive-amplifier. As long as the shifts induced by temperature changes remain below a few keV in registered energy, not compensating for them in hardware will not incur significant loss of spectral performance.

Figure 5A:
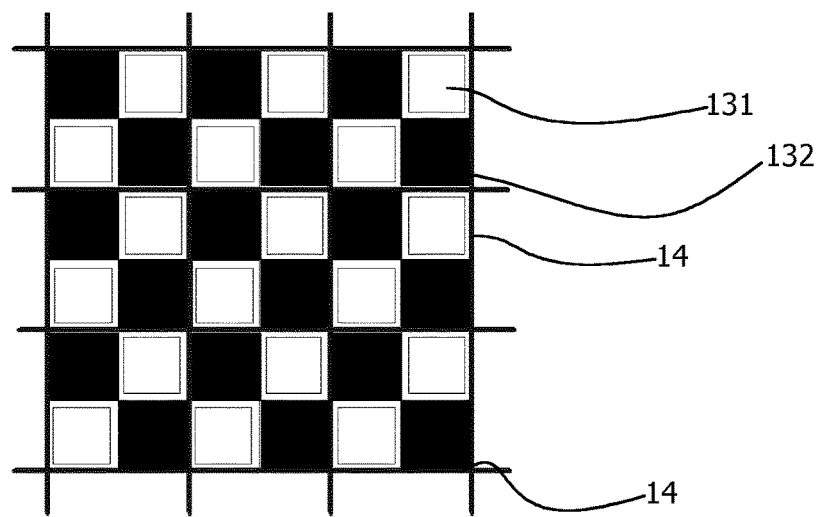
FIG. 5A depicts an array of pixels that are blocked from radiation in a regular pattern.

FIG. 5A shows a further embodiment in which every other pixel 131 in the array 13 is shielded from radiation forming pattern of compensation areas 132. In this example a regular, checkboard-like pattern covering every second pixel in a staggered manner is shown. Besides the previously addressed advantages, this embodiment offers even more advantages beyond those previously mentioned, particularly for Ultra-High Energy (UHR) photon counting imaging.

An ASG 14 already contributes to minimizing charge sharing despite the fact that they are usually arranged at a larger pitch than the pixels of the detector itself. ASGs of finer pitch improve the energy response, at the expense of a higher manufacturing complexity and cost. For a large number of applications this may not be necessary. By shielding every other pixel from radiation the low energy tail is selectively reduced, thereby significantly improving the energy resolution, for a limited number of specific protocols.

Figure 5B:
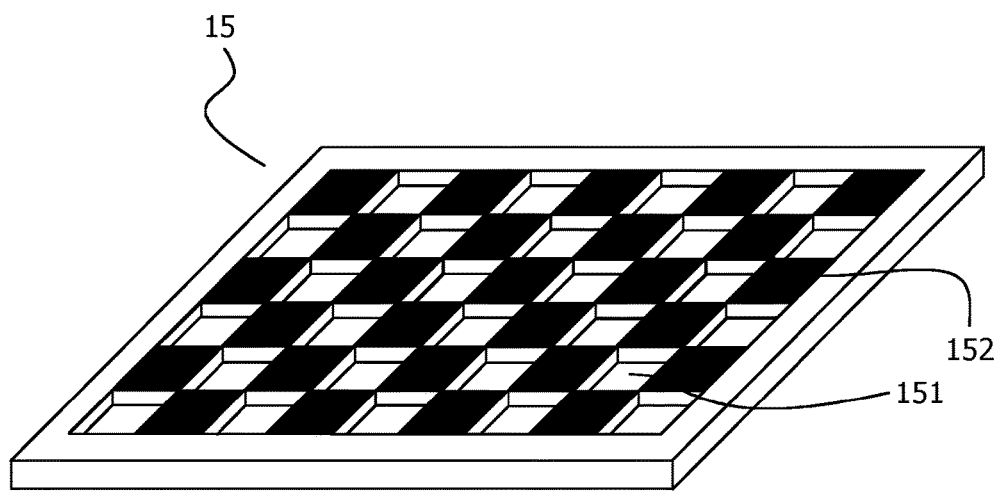
FIG. 5B shows a mask structure that can be used to obtain the regular pattern to block detector pixels.

This embodiment may be seen as obtaining an Ultra High Energy Resolution (UHER) mode that is particularly suitable for specific photon counting radiation imaging application which benefit from higher energy resolution. Similarly to Ultra High Resolution UHR, an effective irradiated area of the detector is reduced. In this case however, not only better spatial resolution is achieved, but also it is ensured that exposed pixels deliver the best possible energy response, largely unaffected by charge sharing from neighboring pixels. In the embodiment shown in FIG. 5B, contrary to the conventional UHR, a shielding mask 15 does not consist of single slits (along the rotation axis) but rather a checkboard-like pattern with openings 151 and shielding sections 152 at half the ASG pitch.

The shielding sections 152 are preferably made of an X-ray absorbing material, e.g. Tungsten, Tantalum, Molybdenum or similar of sufficient thickness (e.g. 100-200 μm). The shielding areas 152 and the openings 151 have the same size as the detector pixels and need to be aligned perfectly to optimally benefit from the advantages.

For an ASG pitch of, for instance, approximately 1 square millimeter it is assumed that the detector will exhibit a 1:4 sub-pixilation, i.e. each ASG section, formed by an area enclosed by ASG walls 14, is aligned and confines 2×2 detector pixels. The aforementioned checkboard pattern will therefore make sure that for each ASG section, only 2 detector pixels (in diagonal) are irradiated. This significantly reduces the probability of charge sharing. The ASG alone already reduces the low energy tail by half (caused by charge sharing). The additional UHER grid 15 will further reduce the remaining tail by an estimate of 90%, yielding an almost perfect spectral response.

The advantages of this invention are not limited to the geometry and number of pixels depicted in the embodiments. Other geometries, aspect ratios, amount of shielded pixels (e.g. 1×2, 3×3, . . . ) and/or circuit implementation may be realized for all embodiments. The circuits shown in FIGS. 4A, B and C require adaptation that a skilled person would know how to implement to fit the single pixel embodiment of FIG. 3B or that of FIG. 5A.

The present invention is relevant for radiation detectors, particularly x-ray detectors that are used in security or medical imaging, such as for instance computed tomography imagers.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

Any reference signs in the claims should not be construed as limiting the scope.

The invention claimed is:

1. A photon counting radiation detector comprising an array of pixels comprising a plurality of direct conversion detection pixels for detecting imaging information, wherein at least one pixel of the array of pixels is shielded from receiving radiation;

further comprising, at least one compensation area that comprises the at least one shielded pixel;

a dark current determiner that is connected to the compensation area and that is configured to measure current from the compensation area and to determine a dark current value from current measured from the at least one compensation area;

a dark current compensator that is configured to apply a dark current compensation to detected imaging information based on the determined dark current value; and an anti-scatter grid that is mounted above the array of pixels, wherein the each of the at least one compensation area is surrounded by walls of the anti-scatter grid, preferably the compensation area covers one or four detection pixels.

2. The photon counting radiation detector according to claim 1, wherein the direct conversion detection pixels are detection pixels based on Cadmium Zinc Telluride or Cadmium Telluride.

3. The photon counting radiation detector according to a claim 1, wherein the at least one shielded pixel is shielded from incoming radiation by a radiation absorbing covering, preferably a radiation absorbing coating or a radiation absorbing structure.

4. The radiation detector according to claim 1, wherein the dark current compensator is configured to apply a dark current compensation by delivering a compensation current, preferably at a compensation current value that is the inverted value of the determined dark current value, to the detection pixels, preferably to all detection pixels.

5. The photon counting radiation detector according to claim 1 wherein the dark current compensator is configured to provide a dark current compensation value that is used to compensate the detected imaging information during image reconstruction.

6. The photon counting radiation detector according to claim 1, wherein a radiation mask shields a plurality of pixels of the array of pixels.

7. The photon counting radiation detector according to claim 6, wherein the radiation mask shields the plurality of pixels in a regular pattern, preferably a checkboard pattern, more preferably covering every other pixel of the array of pixels.

8. A photon counting radiation detector comprising an array of pixels comprising a plurality of direct conversion detection pixels for detecting imaging information, wherein at least one pixel of the array of pixels is shielded from receiving radiation, wherein the dark current determiner is configured to determine the dark current value at a lower sampling rate than that of imaging information.

9. A photon counting radiation detector comprising an array of pixels comprising a plurality of direct conversion detection pixels for detecting imaging information, wherein at least one pixel of the array of pixels is shielded from receiving radiation, wherein the compensation area is surrounded by charge sharing prevention means, preferably a guard ring.

* * * * *